United States Patent
Aranzulla et al.

(10) Patent No.: US 9,283,919 B2
(45) Date of Patent: Mar. 15, 2016

(54) MOVEMENT LIMITING BAND FOR AN AIRBAG MODULE

(75) Inventors: Daniele Aranzulla, Essingen (DE); Martina Rausch, Esslingen (DE)

(73) Assignee: TRW Automotive GmbH (DE)

( * ) Notice: Subject to any disclaimer, the term of this patent is extended or adjusted under 35 U.S.C. 154(b) by 61 days.

(21) Appl. No.: 14/233,772

(22) PCT Filed: Jul. 6, 2012

(86) PCT No.: PCT/EP2012/002855
§ 371 (c)(1),
(2), (4) Date: Mar. 7, 2014

(87) PCT Pub. No.: WO2013/013767
PCT Pub. Date: Jan. 31, 2013

(65) Prior Publication Data
US 2014/0183848 A1    Jul. 3, 2014

(30) Foreign Application Priority Data
Jul. 25, 2011  (DE) .................. 10 2011 108 348

(51) Int. Cl.
*B60R 21/2338* (2011.01)
*D03D 13/00* (2006.01)
*D03D 1/00* (2006.01)
*D03D 3/06* (2006.01)
*D03D 19/00* (2006.01)
*B60R 21/235* (2006.01)

(52) U.S. Cl.
CPC .............. *B60R 21/2338* (2013.01); *D03D 1/00* (2013.01); *D03D 3/06* (2013.01); *D03D 13/008* (2013.01); *D03D 19/00* (2013.01); *B60R 2021/23386* (2013.01); *B60R 2021/23388* (2013.01); *B60R 2021/23538* (2013.01); *D10B 2505/124* (2013.01)

(58) Field of Classification Search
CPC ........... B60R 2021/23386; B60R 2021/23388; B60R 2021/23538; B60R 21/2338; D03D 13/008; D03D 19/00; D03D 1/00; D03D 3/06; D10B 2505/124
USPC ...... 139/35, 383 R, 384 R, 387 R; 280/743.2, 280/743.1; 428/34.1, 36.1, 53, 54, 98, 105, 428/107, 112, 119, 212–218, 220; 442/76, 442/181, 184, 185
See application file for complete search history.

(56) References Cited

U.S. PATENT DOCUMENTS

2010/0187797 A1    7/2010   Debler et al.

FOREIGN PATENT DOCUMENTS

| DE | 103 16 221 | 7/2004 |
|----|-----------|--------|
| DE | 20 2006 015 462 | 1/2007 |
| DE | 10 2008 016 278 | 7/2009 |
| DE | 10 2008 028 921 | 12/2009 |
| DE | 10 2009 005 771 | 7/2010 |

*Primary Examiner* — Arti Singh-Pandey
(74) *Attorney, Agent, or Firm* — Tarolli, Sundheim, Covell & Tummino LLP

(57) ABSTRACT

Elongate woven pulling means (10) for an airbag module comprises plural longitudinal portions (12, 14, 16, 18, 20) that have different warp densities. An airbag module for a vehicle safety system comprises an airbag, pulling means (10) coupled to the airbag and an activation unit coupled to the pulling means for releasing the pulling means upon actuation of the activation unit. The pulling means (10) is an elongate woven pulling means having different warp densities which is fastened to the airbag by a first end portion (12) of low warp density, preferably by stitching, and is coupled to the activation unit by a longitudinal portion (16) of high warp density. A method of manufacturing such pulling means (10) comprises the steps of: weaving a longitudinal portion (12; 20) on a loom of low warp density; and weaving a further longitudinal portion (16; 14, 18) on the loom having high or increasing warp density in the same working step. For weaving an adjustable reed having different widths is employed.

9 Claims, 1 Drawing Sheet

MOVEMENT LIMITING BAND FOR AN AIRBAG MODULE

RELATED APPLICATIONS

This application corresponds to PCT/EP2012/002855, filed Jul. 6, 2012, which claims the benefit of German Application No. 10 2011 108 348.4, filed Jul. 25, 2011, the subject matter, of which are incorporated herein by reference in their entirety.

BACKGROUND OF THE INVENTION

The invention relates to pulling means for an airbag module. The invention further relates to an airbag module for a vehicle safety system. The invention moreover relates to a method of manufacturing pulling means for an airbag module.

In the case of modern vehicle safety systems comprising airbag modules it is endeavored to adapt the safety system ever more individually to different parameters of a crash situation. A known and advantageous option consists in the use of pulling means, such as tethers, by the release of which discharge orifices of the airbag are opened or closed. Alternatively, also the airbag geometry can be influenced and/or an additional airbag volume can be released by pulling means of this type. For an actively controlled tether release a tether release means including an activation unit is required, which is also known by the acronym "TAU" (tether activation unit). Airbag modules having activation units of this type are known, for example, from DE 10 2008 028 921 A1 or DE 10 2009 005 771 A1.

The connection between an active discharge orifice at the airbag and the tether release means has been realized so far by an endless cord (loop, eye). Said cord is made of high-strength polyethylene fibers, especially of "Dyneema" fibers, the ends thereof being spliced into a ring by manual operation (soft splice). The previously used cord cannot be stitched directly onto the airbag, however. Therefore it is necessary to additionally stitch a loop of textile airbag fabric onto the airbag wall into which the cord is inserted.

On the other hand, it is known to stitch so called narrow strips, as they are used, for instance, as tensioning strip on a head bag, directly onto the airbag. Narrow strips of this type are flat and have a uniform width and thickness. They are not suited for use in a tether release means including a pyrotechnical activation unit due to the very limited construction space, however. They are too wide for the corridor of approx. 4 mm available in current activation units. A narrower design is not taken into account, because then the rupture load would not be sufficient and the area available for stitching onto the airbag would be too small.

SUMMARY OF THE INVENTION

It is the object of the invention to provide pulling means or an airbag module comprising pulling means which can be stitched directly onto the airbag and which meets the requirements within the scope of use in a tether release means.

This object is achieved by pulling means for an airbag module comprising the features of the present invention. This object is further achieved by an airbag module for a vehicle safety system comprising the features of the present invention. This object is yet further achieved as by a method of manufacturing pulling means comprising the features of the present invention. Additionally, advantageous and expedient configurations of the pulling means according to the invention, the airbag module according to the invention, and the manufacturing method according to the invention are described herein.

The elongate woven pulling means according to the invention for an airbag module comprises plural longitudinal portions, wherein the longitudinal portions have different warp densities.

The invention is based on the finding that it is possible by clever measures to fabricate pulling means having differently wide longitudinal portions on a loom provided for the manufacture of narrow strips. The different widths are obtained solely by varying the warp density (number of warp threads per length unit in the direction of width of the pulling means) so that the pulling means according to the invention can be manufactured on the loom in one working step and without any reworking.

In this way it is possible to provide woven pulling means constituting a combination of a strap and a cord. Depending on the design and the application, the pulling means can be stitched at one or more wide positions directly onto a particular fabric portion of the airbag so that the introduction of force to control an active discharge orifice or the dynamic deployment behavior of the airbag can be directly performed. Thus the control is effected more quickly and precisely than in the case of comparable solutions.

In accordance with a preferred embodiment of the invention, the pulling means is configured so that a first longitudinal portion, preferably a first end portion having low warp density is followed by a second longitudinal portion having an increasing warp density and the second longitudinal portion is followed by a third longitudinal portion having high warp density. Low warp density means that the respective portion is wider than a portion having high warp density. The indications of "low warp density" and "high warp density" in this context are not intended to be understood as absolute but only as relative indications.

Especially advantageous is a pulling means having two connecting points, i.e. each of the two ends of the pulling means is connected to a particular airbag portion while a central portion of the pulling means is coupled to a tether release means. This is achieved by a pulling means in which the third longitudinal portion is followed by a fourth longitudinal portion having a decreasing warp density and the fourth longitudinal portion is followed by a fifth longitudinal portion, preferably a second end portion of low warp density. In the case of an active discharge orifice the discharge orifice can be further opened by providing two connecting points so that the efficient discharge cross-section is increased.

In order to "accommodate" as many warp threads as possible in the direction of the width of the pulling means in a particular area of the pulling means, especially in the "cord area", it is of advantage to form a longitudinal portion, especially a longitudinal portion of high warp density having a multi-ply weave, especially a hollow twill weave.

On the other hand, it is expedient in those areas of the pulling means provided for connection to the airbag that at least one of the longitudinal portions, especially a longitudinal portion of low warp density is in the form of a plain weave.

A transitional portion between two portions of different warp density, i.e. especially a longitudinal portion having increasing or decreasing warp density, can be a twill weave fabric ("usual" twill fabric).

The invention also provides an airbag module for a vehicle safety system. The airbag module comprises an airbag, a pulling means coupled to the airbag and an activation unit coupled to the pulling means which releases the pulling means upon actuation of the activation unit. The pulling means is an elongate woven pulling means according to the invention fastened to the airbag by a first end portion of low warp density, preferably by stitching, and coupled to the activation unit by a longitudinal portion of high warp density.

As explained already, the pulling means according to the invention combines the advantages of a cord adapted to be properly coupled to the activation unit of a tether release unit with those of a narrow strip adapted to be properly stitched onto the airbag.

Especially for use for active release of a discharge orifice of the airbag an embodiment of the airbag module according to the invention is advantageous in which the pulling means is fastened to the airbag also by a second end portion of low warp density, preferably by stitching.

In the case of such application the efficient flow cross-section of the discharge orifice of the airbag can be better controlled by the pulling means and the activation unit.

Preferably an end portion of the pulling means of low warp density is then fastened to an airbag portion which is directly adjacent to the discharge orifice. In this way direct and thus more efficient force transmission between the pulling means and the airbag portion adjacent to the discharge orifice is ensured compared to previously known solutions having a cord portion of the pulling means indirectly connected to the airbag.

Moreover, the invention provides a method of manufacturing a pulling means for an airbag module, especially a pulling means according to the invention, comprising the steps of:
  weaving a longitudinal portion on a loom having low warp density; and
  weaving a further longitudinal portion on the loop having high or increasing warp density in the same working step.

In accordance with the invention, an adjustable reed having different widths is employed.

By adjusting the reed during weaving the warp density and thus the width of the pulling means are automatically varied without any reworking (cutting, re-forming etc.) being required.

The longitudinal portion of low warp density is preferably woven as plain weave.

The longitudinal portion of high or increasing warp density is preferably woven, on the other hand, as twill or multi-ply weave, especially as hollow twill weave.

BRIEF DESCRIPTION OF THE DRAWINGS

Further features and advantages of the invention are resulting from the following description and from the enclosed drawings which are referred to and in which.

DESCRIPTION OF EMBODIMENTS

Figure 1:
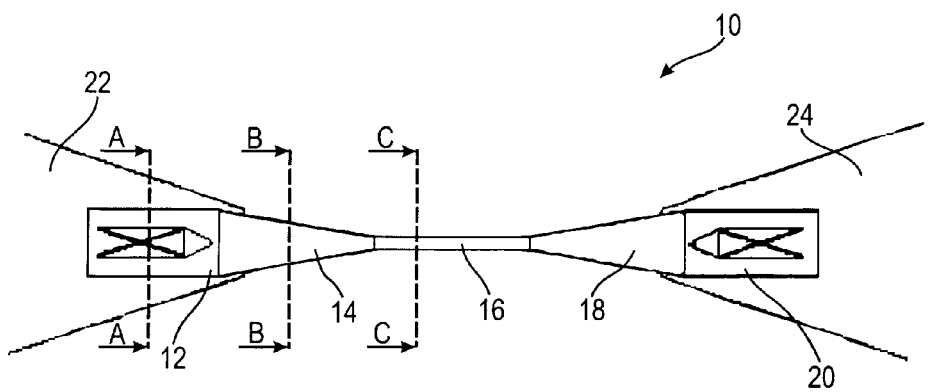
FIG. 1 shows a top view onto a pulling means according to the invention coupled to an airbag in the spread state.
Figure 2:
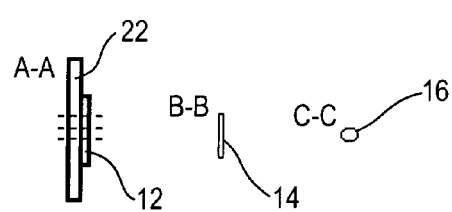
FIG. 2 shows cross-sectional views of the pulling means along the lines of cut A-A, B-B and C-C of FIG. 1.

In FIG. 1 the structure of an elongate pulling means 10 for an airbag module of a vehicle safety system is illustrated. The longitudinal direction of the pulling means 10 hereinafter will also be referred to as x-direction. The pulling means 10 is made of textile fabric and can be subdivided into plural longitudinal portions with respect to its varying width (y-direction):

A flat first portion 12 (hereinafter also referred to as first end portion) of constant width is followed by a flat second portion 14 (first transitional portion) of decreasing width. The latter is followed by a central third portion 16 of constant width which, in contrast to the substantially rectangular cross-sections of the first and second portions 12, 14, has a circular or oval cross-section constant in the x-direction, as is evident in FIG. 2. The fourth portion 18 (second transitional portion) of increasing width which is adjacent to the third portion 16 is transformed into a fifth portion 20 (second end portion) of constant width.

The pulling means 10 is manufactured in one working step on a needle loom as will be described in more detail further below. Over its entire length the pulling means 10 has the same number of warp threads. The varying width of the pulling means 10 is resulting from different warp densities (number of warp threads per length unit in y-direction) in the individual longitudinal portions. The shape of the pulling means 10 hence is not, at least not primarily, obtained by cutting or subsequent re-forming of a fabric part. The two end portions 12, 20 (first and fifth portions) have a comparatively low warp density, whereas the central third portion 16 has a comparatively high warp density. The two transitional portions 14 and 18 (second and fourth portions) have a warp density decreasing or increasing in the x-direction.

Figure 3:
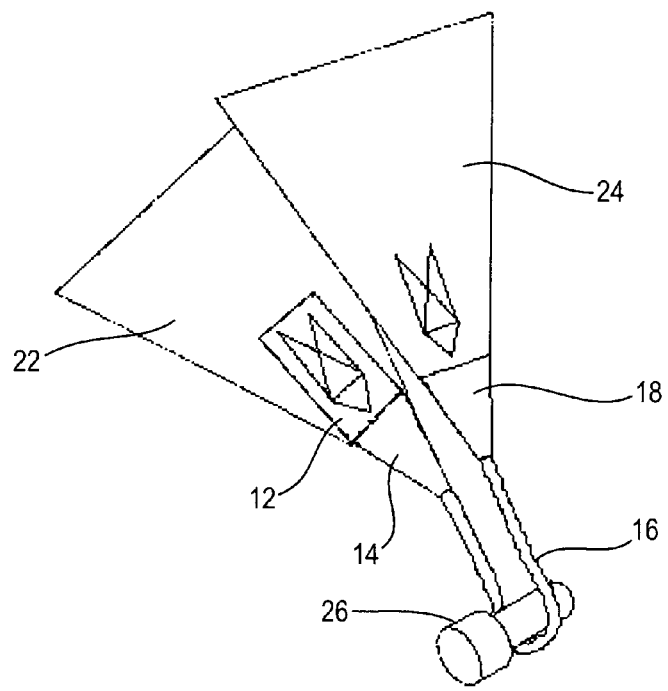
FIG. 3 shows a perspective view of the pulling means coupled to the airbag and to an activation unit.

The pulling means 10 is provided for use in an airbag module comprising an activation unit intended to release the pulling means 10 under certain circumstances. The two flat end portions 12, 20 are stitched directly on two portions 22, 24 of the airbag, especially on two portions adjacent to a discharge orifice. The cord-like central portion 16 is coupled to the activation unit so that the pulling means 10 and thus the airbag portions 22, 24 are restricted as to their mobility in space. In the embodiment according to FIG. 3 the medium portion is placed around an explosive stud 26. Upon actuation of the activation unit which is resulting in destruction or rupture of the explosive stud 26, the pulling means 10 is released. In this way the dynamic deployment behavior of the airbag and/or the efficient cross-section of a discharge orifice of the airbag can be controlled.

It is also possible that the two flat end portions 12, 20 are sewn on top of each other with only one of the two airbag portions 22, 24 and that the airbag portions in turn are interconnected. Equally the two end portions 12, 20 can be connected to only one airbag portion without a second airbag portion having to be provided.

Hereinafter the manufacture of the pulling means 10 will be described for which a needle loom including a specific reed is employed. The reed is adjustable in the vertical direction (z-direction) and has different widths, more exactly speaking the distance varies in the y-direction between the reed dents arranged in line with the height of the reed.

The pulling means 10 is manufactured on the needle loom in one working step in that initially the first portion 12 is woven at constant width. After that, during the further weaving operation the reed is continuously adjusted in the vertical direction so that the distance of the reed dents is continuously decreased. By the fact that the reed is displaced while the warp threads are retained in the same vertical position, the warp threads are pushed together in the narrowing reed gaps so that the working width is continuously decreased. In this way the second portion 14 of decreasing width is formed.

Then the reed is held at a particular height until the third portion 16 of constant width is woven. For weaving the increasingly widening fourth portion 18 and the fifth portion 20 of constant width the reed is appropriately moved in a direction opposite to the one during weaving the second portion and subsequently is fixed at a particular height again.

In addition to varying the height position of the reed, different types of weave are used for the longitudinal portions 12, 14, 16, 18, 20. The wide end portions 12, 20 are woven single-ply with a narrow weave, especially a plain weave. For the transitional portions 14, 18 a weave having fewer weave points is used, especially twill weave. The knitting needle of the mesh row on the right side of the needle loom must follow the movement of the reed sideward from the right to the left.

The extremely small width of the central portion 16 is obtained by the assistance of a multi-ply weave, especially a hollow twill weave. Such weave allows for accommodating the total number of warp threads in a very narrow area. In this way sort of a cord is made of the original flat-woven material in this area.

The entire weaving operation (i.e. from "wide" to "narrow" and "narrow" to "wide") is assisted by a previously determined controlled weft feed and tension.

In accordance with another embodiment, the pulling means 10 includes no fourth and fifth portions, i.e. the cord-like third portion 16 constitutes the second end portion. For a suitable coupling of said portion 16 to the activation unit the third portion 16 later can be reformed into a loop.

LIST OF REFERENCE NUMERALS

10 pulling means
12 first longitudinal portion (first end portion)
14 second longitudinal portion (first transitional portion)
16 third longitudinal portion (central portion)
18 fourth longitudinal portion (second transitional portion)
20 fifth longitudinal portion (second end portion)
22 airbag portion
24 airbag portion
26 explosive stud

The invention claimed is:

1. An airbag module for a vehicle safety system, comprising:
   an airbag; and
   an elongate woven pulling means having a first end fastened to the airbag and a second end fastened to structure of the airbag module;
   wherein the pulling means comprises plural longitudinal portions having different warp densities and wherein the first end has a low warp density and the second end has a high warp density.

2. The pulling means (10) according to claim 1, wherein, a first longitudinal portion (12) of low warp density is followed by a second longitudinal portion (14) of increasing warp density and the second longitudinal portion (14) is followed by a third longitudinal portion (16) of high warp density.

3. The pulling means (10) according to claim 2, wherein the third longitudinal portion (16) is followed by a fourth longitudinal portion (18) of decreasing warp density and the fourth longitudinal portion (18) is followed by a fifth longitudinal portion (20) of low warp density.

4. The pulling means (10) according to claim 1, wherein at least one of the longitudinal portions (16) comprising a longitudinal portion of high warp density is formed by multi-ply weave.

5. The pulling means according to claim 4, wherein the longitudinal portion of high warp density is formed by a hollow twill weave.

6. The pulling means (10) according to claim 1, wherein at least one of the longitudinal portions (12, 20) of low warp density is formed as plain weave.

7. The pulling means (10) according to claim 1, wherein at least one of the longitudinal portions (14, 18) of increasing or decreasing warp density is formed as twill weave.

8. The airbag module according to claim 1, further comprising an activation unit, wherein the second end of the pulling means is coupled to the activation unit, the activation unit being actuatable to release the pulling means.

9. The pulling means according to claim 1, wherein the pulling means has different widths along its length, the different widths being produced by the different warp densities.

* * * * *